United States Patent [19]
Rivoallon

[11] Patent Number: 4,586,959
[45] Date of Patent: May 6, 1986

[54] COMPOSITION FOR FACING IN THE BUILDING FIELD

[75] Inventor: Jean Rivoallon, Compiegne, France

[73] Assignee: Societe Francaise Hoechst, Puteaux, France

[21] Appl. No.: 698,537

[22] Filed: Feb. 5, 1985

[30] Foreign Application Priority Data

Feb. 6, 1984 [FR] France .................................. 84 01764
Jan. 15, 1985 [FR] France .................................. 85 00521

[51] Int. Cl.$^4$ .............................................. C09D 1/02
[52] U.S. Cl. .......................................... 106/84; 106/74; 252/62; 427/180; 427/427
[58] Field of Search ................ 106/74, 84; 252/62; 427/427, 180

[56] References Cited

U.S. PATENT DOCUMENTS

| | | | |
|---|---|---|---|
| 2,440,969 | 5/1948 | Nightingall | 117/127 |
| 2,905,563 | 9/1959 | Ilenda et al. | 106/74 |
| 4,179,535 | 12/1979 | Kalbskopf et al. | 427/419.4 |
| 4,263,048 | 4/1981 | Hacker | 106/84 |
| 4,419,256 | 12/1983 | Loomis | 106/74 |

FOREIGN PATENT DOCUMENTS

| | | |
|---|---|---|
| 0004882 | 10/1979 | European Pat. Off. . |
| 1417893 | 12/1964 | France . |
| 2353264 | 12/1977 | France . |
| 49-40133 | 10/1974 | Japan .................................. 106/84 |

OTHER PUBLICATIONS

*Chemical Abstracts,* vol. 97, 1982, p. 328.

*Primary Examiner*—William R. Dixon, Jr.
*Assistant Examiner*—Steven Capella
*Attorney, Agent, or Firm*—Sheridan Neimark

[57] ABSTRACT

The present invention relates to a composition intended for the preparation of facings by spraying by means of a hose a mixture based on rock wool (A), the composition having an almost instantaneous setting time and a formulation necessarily comprising a combination of (1) at least one powder product (B) containing at least 30% of sodium or potassium bicarbonate, the remainder comprising a compound of acid nature selected from the group comprising calcium chloride, sulfamic acid and sodium bicarbonate, in association with or without association with a solid silicate of sodium or potassium and (2) of at least an aqueous solution (C) of sodium or potassium silicate.

16 Claims, No Drawings

COMPOSITION FOR FACING IN THE BUILDING FIELD

This invention relates to a composition for preparing facings. Nowadays, insulating facings are known which are sound-proof and fire-proof and made from rock wool and obtained by a projection from a suitable hose of an extemporaneous mixture of rock wool, cement and water.

However, such facings having setting times of several hours; therefore, they require very often, especially where their thickness is high, the presence of a metallic supporting network and upon preparation thereof they release noxious cement dust requiring special protection of the workforce.

The Applicant has however discovered in an entirely unexpected manner a composition based on rock wool and silicate of at least one alkali metal which can remedy such disadvantages.

The composition permits easy correction of insulating, soundproof and fireproof facings having moreover improved physical characteristics to produce especially a high setting speed and a low density.

A composition according to the invention for preparing facings by projection by means of a hose of a mixture based on rock wool A having a an almost instantaneous setting time is characterized in that it necessarily comprises the combination of (1) at least one powder product B containing at least 30% of sodium or potassium bicarbonate, the remainder comprising a compound of acid nature selected from calcium chloride, sulfamic acid and sodium bicarbonate optionally in association with a solid sodium or potassium silicate, and (2) of at least an aqueous solution C of sodium or potassium silicate.

According to a particular mode of embodiment, the composition according to the invention comprises (1) at least one powder product B containing at least one third in parts by weight of sodium or potassium bicarbonate, the remainder comprising calcium chloride and at least one solid sodium or potassium silicate and (2) at least an aqueous solution C of sodium or potassium silicate.

The composition according to the invention is prepared just prior use by intimate mixture of the three products A, B and C.

The product A is rock wool with long fibers currently marketed for such application; usually the fibers are of a diameter of 4 to 6 micrometers and a length of 1 to 2 centimeters.

According to an advantageous form of embodiment, product B is a powder containing by weight:
from 30 to 60% of sodium or potassium bicarbonate,
from 20 to 50% of calcium chloride crystallized with two molecules of water,
from 10 to 30% of atomized commercial sodium or potassium silicate, of a weight ratio of $SiO_2/M_2O$ between 2 and 3.35 when M represents sodium and between 2 and 2.25 when M represents potassium, of molecular ratio of $SiO_2/M_2O$ between 2 and 3.4 when M represents sodium and between 3.1 and 3.5 when M represents potassium, of an apparent density of between 0.4 and 0.7 and containing $20\pm5\%$ by weight water.

The product C is an aqueous liquid containing by weight:
from 0 to 100% advantageously, from 60 to 80% of liquid commercial sodium silicate, of a ratio by weight of $SiO_2/Na_2O$ between 1.60 and 3.35, of a molecular ratio between 1.65 and 3.45 and containing $60\pm10\%$ by weight of water,
from 100 to 0%, advantageously from 40 to 20% of liquid commercial potassium silicate, of a ratio by weight of $SiO_2/K_2O$ between 1.8 and 2.6 and of a molecular ratio between 2.85 and 4.1, and containing $70\pm10\%$ by weight of water.

In this mode of embodiment of the invention, the product B preferably contains by weight from 30 to 60% of potassium bicarbonate, from 20 to 50% of calcium chloride crystallized with two molecules of water and from 10 to 30% of atomized sodium silicate of a weight ratio of $SiO_2/Na_2O$ of 3.35, of a molecular ratio of 3.46 and containing $22\pm2\%$ by weight of water, designated hereinafter as "atomized sodium silicate 5 Na TS" and the product C contains by weight from 60 to 80% of liquid commercial sodium silicate, of a ratio by weight of $SiO_2/Na_2O$ of 3.35, of a molecular ratio of 3.45 and containing $65\pm4\%$ of water, designated hereinafter as "liquid sodium silicate, Na 4/1", and from 40 to 20% of liquid potassium silicate, of a ratio by weight of $SiO_2/K_2O$ of 2.6, of a molecular ratio of about 4 and containing $65\pm4\%$ of water, designated hereinafter as "liquid potassium silicate KA/O".

Advantageously, such a composition according to the invention contains in proportions by weight:
from 30 to 60% of product A,
from 5 to 15% of product B, and
from 30 to 60% of product C, and still better,
from 40 to 55% of product A,
from 6 to 12% of product B, and
from 40 to 50% of product C.

More especially, the composition according to this invention contains in proportions by weight:
from 40 to 55% of product A,
from 6 to 12% of product B containing by weight:
from 30 to 60% of potassium bicarbonate,
from 20 to 50% of calcium chloride crystallized with two molecules of water,
from 10 to 30% of atomized sodium silicate 5 Na TS,
from 40 to 60% of product C containing by weight:
from 60 to 80% of liquid sodium silicate Na 4/1,
from 40 to 20% of liquid potassium silicate KA/O.

According to another advantageous form of embodiment, the composition according to the invention comprises: (1) at least one powder product (B) containing at least 30% by weight of potassium bicarbonate, the remainder comprising sulfamic acid, and possibly, sodium bicarbonate, and (2) at least an aqueous solution (C) of sodium or potassium silicate.

According to another advantageous form of embodiment, the product B is a powder, containing by weight:
from 30 to 98% of potassium bicarbonate,
from 2 to 10% of sulfamic acid,
and, if necessary, the complement to 100% of sodium bicarbonate.

The product C is a liquid containing from 0 to 40% of water and from 100 to 60% of a mixture of 0 to 100% and advantageously from 60 to 80% of liquid commercial sodium silicate, of a ratio by weight $SiO_2/Na_2O$, between 1.60 and 3.35, of molecular ratio between 1.65 and 3.45 and containing $60\pm10\%$ by weight of water, and from 100 to 0%, advantageously from 40 to 20%, of liquid commercial potassium silicate of a ratio by weight $SiO_2/K_2O$ between 1.8 and 2.6 and of a molecular ratio between 2.85 and 4.1, and containing $70\pm10\%$ by weight of water.

In this mode of embodiment, the product B contains by weight from 35 to 60% of potassium bicarbonate, from 60 to 35% of sodium bicarbonate, and from 5 to 7% of sulfamic acid and the product C contains by weight from 0 to 40% of water, and from 100 to 60% of a mixture:

of from 60 to 80% of liquid commercial sodium silicate, of a ratio by weight $SiO_2/Na_2O$, of 3.35, of a molecular ratio of 3.45 and containing 65±4% of water, designated hereinafter as "liquid sodium silicate Na 4/1" and from 40 to 20% of liquid potassium silicate, of a ratio by weight $SiO_2/K_2O$ of 2.6, of a molecular ratio of about 4 and containing 75±4% of water, designated hereinafter as "liquid potassium silicate KA/O".

The composition according to the invention contains in proportions by weight:
from 30 to 65% of product A,
from 3 to 10% of product B, and
from 25 to 60% of product C, and still better,
from 40 to 65% of product A,
from 4 to 6% of product B, and
from 30 to 55% of product C.

Thus, a composition according to the invention can be one of the compositions given hereinafter, by way of examples.

The composition according to the invention has an almost instantaneous setting time. Due to this it is prepared extemporaneously by mixture of products A, B and C, in the ejection cone of a projection hose, currently used conventionally for producing facings based on rock wool and cement. Such hose is supplied with products A, B and C by any known means. Thus, products A and B, being solid, alone or in admixture, are brought into suspension, and then propelled to the central nozzle of the hose by air under pressure.

As to product C which is liquid, it is carried to the hose under pressure by means of a pump, and then, is ejected through lateral nozzles distributed on the periphery of the central nozzle. The composition according to the invention is thus obtained during its spraying onto the walls to be faced. Due to its very short setting time, the composition becomes fixed to the walls whatever the slope thereof, both on vertical walls and on ceilings, without producing run out and/or droppings up to deposit thicknesses of 100 mm, while letting the experienced man of the art free to work it out for a few minutes, by means of trowel or hawk so as to improve appearance of the so obtained facing.

Moreover, the almost instantaneous setting time of the composition according to the invention does not permit escape of air included in the facing. As a matter of fact, a volume of air is entrapped when the composition according to the invention is projected to the walls to form a facing thereon. Due to this, a very porous facing is obtained having a low density in the order of 120–130±15 kg, per $m^3$, much lower than the density in the order of 250±25 kg per $m^3$, of known facings based on rock wool and cement.

Due to their low density and porous structure the facings obtained with the composition according to the invention have excellent insulating and fireproofing properties and they can be applied easily in one move, up to thicknesses of 10 cm onto walls having very different slopes, both vertical and horizontal of the ceiling type.

By way of illustration, two compositions according to the invention will be given hereinafter for obtaining about 2.5 $m^2$ of a facing of a thickness of 10 cm, i.e. 0.25 $m^3$, then two compositions according to the invention for obtaining about 1 $m^2$ of a facing of a thickness of 10 cm, i.e. 0.10 $m^3$.

First composition 25 kg (44.4%) of rock wool with long fibers of a diameter of 4 to 6 micrometers, and a length of 5 to 6 cm,
2.5 kg (4.4%) of potassium bicarbonate,
2.5 kg (4.4%) of calcium chloride crystallized with two molecules of water,
1.25 kg (2.2%) of atomized sodium silicate 5 Na TS,
17 kg (30.2%) of liquid sodium silicate Na 4/1,
8 kg (14.2%) of liquid potassium silicate KA/O.

Second Composition

This composition is identical to the first composition except that only 1.25 kg of calcium chloride crystallized with two molecules of water is used. It has in percentages by weight the following values:
45.5% of rock wool,
4.5% of potassium bicarbonate,
2.25% of calcium chloride crystallized with two molecules of water,
2.25% of atomized sodium silicate 5 Na TS,
31% of liquid sodium silicate Na 4/1,
14.5% of liquid potassium silicate KA/O.

Multiple formulae can be used by modifying in particular the quantities of calcium chloride introduced therein.

It will be understood that the calcium chloride crystallized with two molecules of water can be replaced by the equivalent quantity of anhydrous calcium chloride hydrous calcium chloride or crystallized with 4 or 6 molecules of water.

Third composition 10 kg (55.5%) of rock wool with long fibers of a diameter of 4 to 6 micrometers, and a length of from 5 to 6 cm,
0.6 kg (3.33%) of potassium bicarbonate,
0.35 kg (1.95%) of sodium bicarbonate,
0.05 kg (0.27%) of sulfamic acid,
4.75 kg (26.4%) of liquid sodium silicate Na 4/1,
2.25 kg (12.5%) of liquid potassium silicate KA/O.

Fourth composition 10 kg (47.62%) of rock wool with long fibers of a diameter of 4 to 6 micrometers and from 5 to 6 cm in length;
0.6 kg (2.86%) of potassium bicarbonate,
0.35 kg (1.66%) of sodium bicarbonate,
0.05 kg (0.24%) of sulfamic acid,
3 kg (14.28%) of water,
4.75 kg (22.62%) of liquid sodium silicate Na 4/1,
2.25 kg (10.71%) of liquid potassium silicate KA/O.

It will be understood that this invention was only described in a purely explanatory manner and not at all limitatively, and that any modification can be entered thereinto without departing from its scope.

I claim:

1. A composition intended for the preparation of facings by spraying by means of a hose a mixture comprising rock wool (A), the composition having an almost instantaneous setting time and a formulation necessarily comprising a combination of: (1) at least one powder product (B) consisting essentially of at least 30% of sodium or potassium bicarbonate, and a compound selected from the group consisting of calcium chloride, sulfamic acid and sodium bicarbonate, and optionally a solid silicate of sodium or potassium, and (2) an amount sufficient to almost instantaneously set the composition of at least an aqueous solution (C) of sodium or potassium silicate.

2. A composition according to claim 1, comprising (1) at least one powder product (B) containing at least one third in parts by weight of sodium or potassium bicarbonate, the remainder of (B) comprising calcium chloride and at least a solid silicate of sodium or potassium, and (2) at least an aqueous solution (C) of sodium or potassium silicate.

3. A composition intended for the preparation of facings by spraying by means of a hose a mixture, comprising rock wool (A), the composition having an almost instantaneous setting time and a formulation necessarily comprising a combination of: (1) at least one powder product (B) consisting essentially of at least 30% by weight of potassium bicarbonate, sulfamic acid, and optionally sodium bicarbonate, and (2) at least an aqueous solution (C) of sodium or potassium silicate.

4. A composition intended for the preparation of facings by spraying by means of a hose a mixture, comprising about the following by weight:
   from 30 to 60% of rock wool (A)
   from 5 to 15% of a powder product (B) consisting of:
     from 30 to 60% of sodium or potassium bicarbonate,
     from 20 to 50% of calcium chloride crystallized with two molecules of water,
     from 10 to 30% of atomized sodium or potassium silicate,
   from 30 to 60% of an aqueous liquid (C) consisting of:
     from 0 to 100% of liquid sodium silicate,
     from 100 to 0% of liquid potassium silicate.

5. A composition for the preparation of facings by spraying by means of a hose a mixture, comprising about the following by weight:
   from 30 to 60% of rock wool (A),
   from 5 to 15% of a powder product (B) consisting of:
     from 30 to 60% of potassium bicarbonate,
     from 20 to 50% of calcium chloride crystallized with two molecules of water,
     from 10 to 30% of atomized sodium silicate,
   from 30 to 60% of an aqueous liquid (C) consisting of:
     from 60 to 80% of liquid sodium silicate,
     from 40 to 20% of liquid potassium silicate.

6. A composition according to claim 5, wherein the atomized sodium silicate used has a ratio by weight of $SiO_2/Na_2O$ of 3.35, a molecular content of $SiO_2/Na_2O$ of 3.46 and a water ratio of $22\pm2\%$.

7. A composition according to claim 5, wherein the liquid sodium silicate used presents a ratio by weight of $SiO_2/Na_2O$ of 3.35, a molecular ratio of 3.45 and a water content of $65\pm4\%$.

8. A composition according to claim 5, wherein the liquid potassium silicate used presents a ratio by weight of $SiO_2/K_2O$ of 2.6, a molecular ratio of about 4, and a water content of $75\pm4\%$.

9. A composition according to claim 3, comprising about the following by weight:
   from 30 to 65% of rock wool (A),
   from 3 to 10% of a powder product (B) consisting of:
     from 30 to 98% of potassium bicarbonate,
     from 2 to 10% of sulfamic acid,
     and, if necessary, the complement to 100% of sodium bicarbonate,
   from 25 to 60% of an aqueous liquid (C) consisting of:
     from 0 to 40% of water,
     from 100 to 60% of a mixture of 0 to 100% of liquid sodium silicate and from 100 to 0% of commercial liquid potassium silicate.

10. A composition according to claim 9, wherein the liquid sodium silicate used presents a ratio by weight of $SiO_2/Na_2O$ of 3.35, a molecular ratio of 3.45 and a water content of $65\pm4\%$.

11. A composition according to claim 9, wherein the liquid potassium silicate used has a ratio by weight of $SiO_2/K_2O$ of 2.6, a molecular ratio of about 4 and a water content of $65\pm4\%$.

12. A composition according to claim 7, comprising
   40-5.5% of said rock wool (A),
   6-12% of powder product (B),
   said atomized sodium silicate having a ratio by weight of $SiO_2/Na_2O$ of 3.35, a molecular ratio of $SiO_2/Na_2O$ of 3.46 and a water content of $22\pm2\%$,
   40-50% of said aqueous liquid (C) wherein said liquid potassium silicate has a ratio by weight of $SiO_2/K_2O$ of 2.6, a molecular ratio of about 4, and a water content of $75\pm4\%$.

13. A composition according to claim 3, containing by weight:
   from 35 to 60% of rock wool (A),
   from 3.5 to 6% of powder product (B) consisting of:
     from 60 to 35% of potassium bicarbonate,
     from 35 to 60% of sodium bicarbonate,
     from 5 to 7% of sulfamic acid,
   from 35 to 60% of an aqueous liquid (C) consisting of:
     from 0 to 40% of water,
     from 100 to 60% of a mixture consisting of:
       from 60 to 80% of liquid sodium silicate having a ratio by weight of $SiO_2/Na_2O$ of 3.35, a molecular ratio of 3.45 and a water content of $65\pm4\%$,
       from 40 to 20% of liquid potassium silicate having a ratio by weight of $SiO_2/K_2O$ of 2.6, a molecular ratio of about 4 and a water content of $65\pm4\%$.

14. A composition according to claim 1 wherein said aqueous solution (C) is present in an amount of 30%-60%.

15. A method of preparing a soundproof and fireproof facing, comprising
   spraying, by means of a nozzle, (A) rock wool; and (B) at least one powder product consisting essentially of at least 30% of sodium or potassium bicarbonate, and a compound selected from the group consisting of calcium chloride, sulfamic acid and sodium bicarbonate, and optionally a solid silicate of sodium or potassium;
   supplying to said nozzle under pressure a liquid product comprising an aqueous solution of sodium or potassium silicate;
   projecting from the nozzle a mixture of said rock wool, said powder product and said aqueous solution; and
   forming and solidifying said admixture as an insulating soundproof and fireproof coating having a density in the order of $120-130\pm15$ Kg/m$^3$.

16. A solidified soundproof and fireproof facing comprising a mixture of (A) rock wool; (B) at least one powder product consisting essentially of at least 30% sodium or potassium bicarbonate and a compound selected form the group consisting of calcium chloride, sulfamic acid and sodium bicarbonate, and optionally a solid silicate of sodium or potassium; and (C) a dried in situ aqueous solution of sodium or potassium silicate; said facing being very porous and having a low density on the order of $120-130\pm15$ Kg/m$^3$.

* * * * *